US 6,669,273 B1

(12) United States Patent
Glovatsky et al.

(10) Patent No.: US 6,669,273 B1
(45) Date of Patent: Dec. 30, 2003

(54) VEHICLE INSTRUMENT PANEL STRUCTURE TO SUPPORT ELECTRONICS PACKAGING

(75) Inventors: Andrew Z. Glovatsky, Plymouth, MI (US); Thomas B. Krautheim, Belleville, MI (US); Daniel R. Vander Sluis, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/245,764

(22) Filed: Sep. 16, 2002

(51) Int. Cl.[7] .............................................. B62D 25/14
(52) U.S. Cl. ................... 296/193.02; 296/70; 296/208; 174/251; 174/254; 361/749; 361/751
(58) Field of Search ............................. 296/193.02, 70, 296/146.7, 208, 901.01; 174/251, 254, 268; 361/749, 750, 751

(56) References Cited

U.S. PATENT DOCUMENTS

| 5,324,203 | A | * | 6/1994 | Sano et al. ..................... 439/34 |
| 5,354,114 | A | | 10/1994 | Kelman et al. |
| 5,678,877 | A | * | 10/1997 | Nishijima et al. ............. 296/70 |
| 5,712,764 | A | | 1/1998 | Baker et al. |
| 5,715,140 | A | * | 2/1998 | Sinkunas et al. ........... 361/690 |
| 5,856,908 | A | | 1/1999 | Takiguchi et al. |
| 5,934,733 | A | | 8/1999 | Manwaring |
| 5,979,540 | A | | 11/1999 | Allison et al. |
| 5,979,965 | A | * | 11/1999 | Nishijima et al. ............. 296/70 |
| 6,250,706 | B1 | | 6/2001 | Davis, Jr. et al. |
| 6,257,897 | B1 | | 7/2001 | Kubota |
| 6,300,859 | B1 | * | 10/2001 | Myong et al. ............... 337/182 |
| 6,344,613 | B1 | * | 2/2002 | Kolodziej .................. 174/72 A |
| 6,388,201 | B2 | * | 5/2002 | Yamato et al. .............. 174/255 |
| 6,523,878 | B2 | * | 2/2003 | Scheidel ....................... 296/70 |
| 6,561,563 | B2 | * | 5/2003 | Okana et al. .................. 296/70 |
| 6,597,578 | B2 | * | 7/2003 | Shiina et al. ................ 361/728 |
| 2001/0003070 | A1 | * | 6/2001 | Asao .......................... 439/76.2 |
| 2002/0017798 | A1 | * | 2/2002 | Shikata et al. ................. 296/70 |
| 2003/0094831 | A1 | * | 5/2003 | Kondo et al. .................. 296/70 |

FOREIGN PATENT DOCUMENTS

| FR | 2697715 A1 | * | 5/1994 | ............ H05K/3/40 |
| GB | 2166603 A | * | 5/1986 | ............ H01B/7/08 |
| JP | 58-156437 A | * | 9/1983 | ............ B60R/16/02 |

* cited by examiner

Primary Examiner—Joseph D. Pape
(74) Attorney, Agent, or Firm—Brinks Hofer Gilson & Lione

(57) ABSTRACT

An automobile instrument panel assembly for the cockpit of an automobile. The assembly includes, in one embodiment, a cross-car beam structure for supporting the assembly. The structure extends across a substantial portion of the cockpit and defines a plurality of generally planar mounting sites and further defines at least one recess. At least one substrate is mounted to the beam and includes at least one area of the substrate populated by electronic components on both sides of the substrate. The area is aligned over the at least one recess, and an instrument panel cover is removably positioned over the substrate and the structure.

19 Claims, 6 Drawing Sheets

VEHICLE INSTRUMENT PANEL STRUCTURE TO SUPPORT ELECTRONICS PACKAGING

FIELD OF THE INVENTION

The present invention generally relates to automotive instrument panels. In particular, the present invention relates to an instrument panel assembly for the cockpit of an automobile comprised of a cross-car structure that allows integration of double-sided flatwire componentry.

BACKGROUND OF THE INVENTION

Conventional instrument panel assemblies use a metal, plastic or combination structure as a cross-car beam. Electronic components that service the vehicle, such as the radio control or navigation system, and the wiring associated with them, are packaged into boxes which are then attached to the beam. Specialized bracketry which must be welded or bolted onto the cross-car beam is required to attach the boxes to the cross-car beam. These boxes, connectors and the conventional round wires associated with them add cost to the assembly of the instrument panel and inefficiently use large amounts of space within the instrument panel assembly. Furthermore, these components and their associated mountings are subject to wear and vibration.

In the past, some of these shortcomings were partially alleviated through the use of more complex wiring harnesses that attempted to unify electrical components into more populated sites on the instrument panel structure. However, the increasingly complex nature of automotive electronics, which typically involve the implementation of computers, navigation systems, and other diagnostic systems, requires more complicated and numerous electronic componentry. With the increasing number of electronic components being utilized in automobiles, it is desirable to provide space savings while maintaining the serviceability of such components.

BRIEF SUMMARY OF THE INVENTION

In one aspect of the present invention, an automobile instrument panel assembly for the cockpit of an automobile is provided. The assembly includes, in one embodiment, a cross-car beam structure for supporting the assembly. The structure extends across a substantial portion of the cockpit and defines a plurality of generally planar mounting sites and further defines at least one recess. At least one substrate is mounted to the beam and includes at least one area of the substrate populated by electronic components on both sides of the substrate. The area is aligned over the at least one recess. An instrument panel cover is removably positioned over the substrate and the structure.

In another aspect of the invention, a cross-car structure for supporting an instrument panel is provided comprising at least one integrated and elongated beam. The beam defines a plurality of generally planar mounting areas for attachment to flatwire and populated flatwire sites. The beam further defines a plurality of recesses adapted to receive double-sided populated substrates in communication with the flatwire.

In yet another aspect of the invention, a method for supporting an instrument panel and associated electronic componentry is disclosed. The method includes the steps of providing a cross-car beam having at least one integrated and elongated beam. The beam defines a plurality of generally planar mounting areas for attachment to flatwire and populated flatwire sites, and the beam further defines a plurality of recesses adapted to receive double-sided populated substrates in communication with the flatwire. A populated substrate and flatwire are then connected with the beam, and a substrate having at least one double-sided populated area is connected with the beam. The double-sided populated area is aligned over the at least one recess and secured in place with adhesive, fasteners or clips. A cover may also be removably attached to the assembly over the substrate to provide additional hold-down force and protection. Then the cockpit or instrument panel skin cover is applied.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
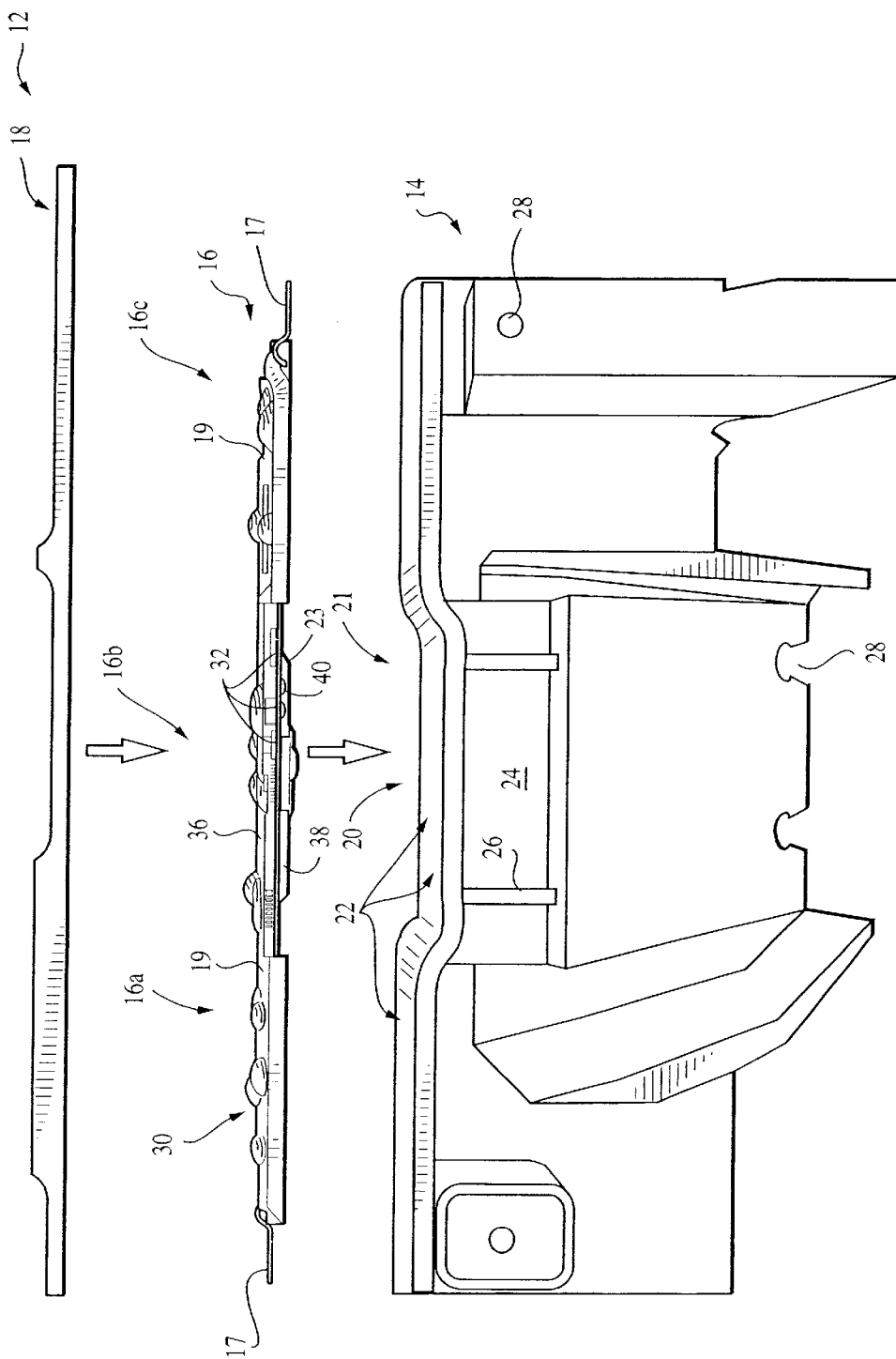
FIG. 1 is a cross-sectional exploded view of an instrument panel assembly including a populated substrate in accordance with the present invention.
Figure 2:
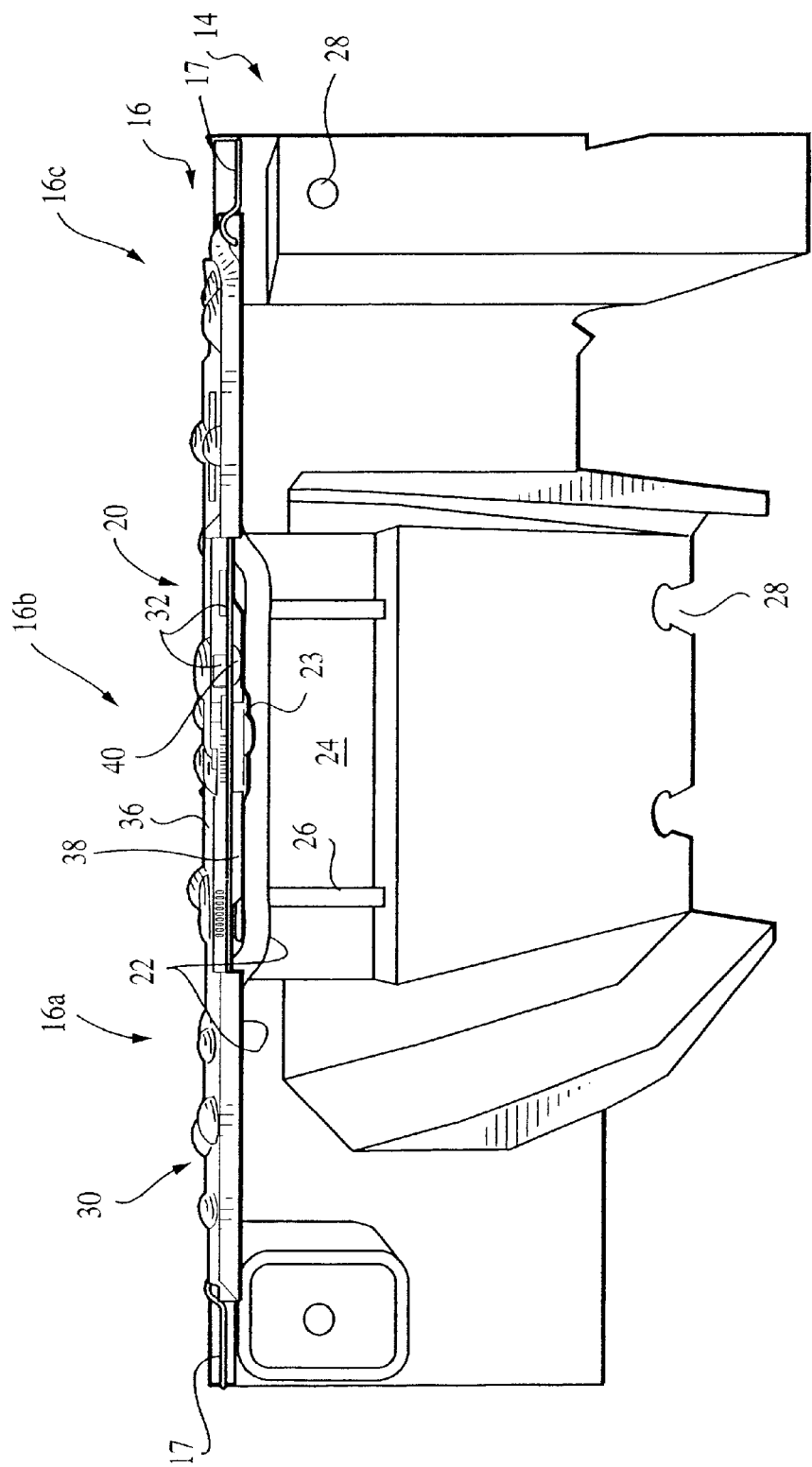
FIG. 2 is a view of the embodiment of FIG. 1 showing the assembled cross-section view of a double-sided populated substrate attached to a cross-car structure in accordance with the present invention.

FIGS. 1 and 2 illustrate a first embodiment of an integrated instrument panel assembly 12 for installation within the cockpit of an automobile. In the exploded diagram of FIG. 1, the various components of the instrument panel assembly 12 are visible, and in FIG. 2, the assembled components are shown. In particular, an integrated cross-car beam structure 14 is shown in combination with a double-side populated substrate 16 and instrument panel skin 18.

The cross-car beam structure 14 provides sites for placement of populated flatwire or circuit boards to be placed in a planar or non-planar manner.

The cross-car beam structure 14 preferably includes a plurality of structural ribs extending laterally across the structure to provide lateral structural support. The cross-car beam structure 14 may also include a plurality of protrusions along the length of the structure to form recessed areas such as recessed areas 20 to form a mounting site 21. The cross-car beam structure 14 preferably runs at least the entire width of the vehicle cockpit (not shown) and connects with the A-pillars of the vehicle. This provides rigidity to the vehicle and improved vibrational performance of the beam. The cross-car structure 14 may be rigidly connected to the rest of the automobile body through weldments or bolts. The cross-car beam structure 14 is preferably made of magnesium for low-weight applications, however the cross-car beam structure 14 may also be made of any high strength structural material such as steel, composite molded plastic or aluminum. The beam structure 14 may also be made from a molded high-strength plastic material. The cross-car beam structure 14 is preferably an integrally molded one-piece elongated beam. The beam also preferably includes a plurality of recessed areas 20 and generally planar areas 22 defined thereon. Furthermore, various openings 24, partitions 26 and mounting structures 28 may further be defined on the beam 14.

One or more flatwire bus structures 17, which preferably comprise a plurality of linked wire-like structures as are well known in the art, are electrically connected at various points to the substrate 16 as shown. These flatwire bus structures 17 may communicate with other substrates and electronic componentry throughout the cockpit of the vehicle and other parts of the vehicle.

Figure 3:
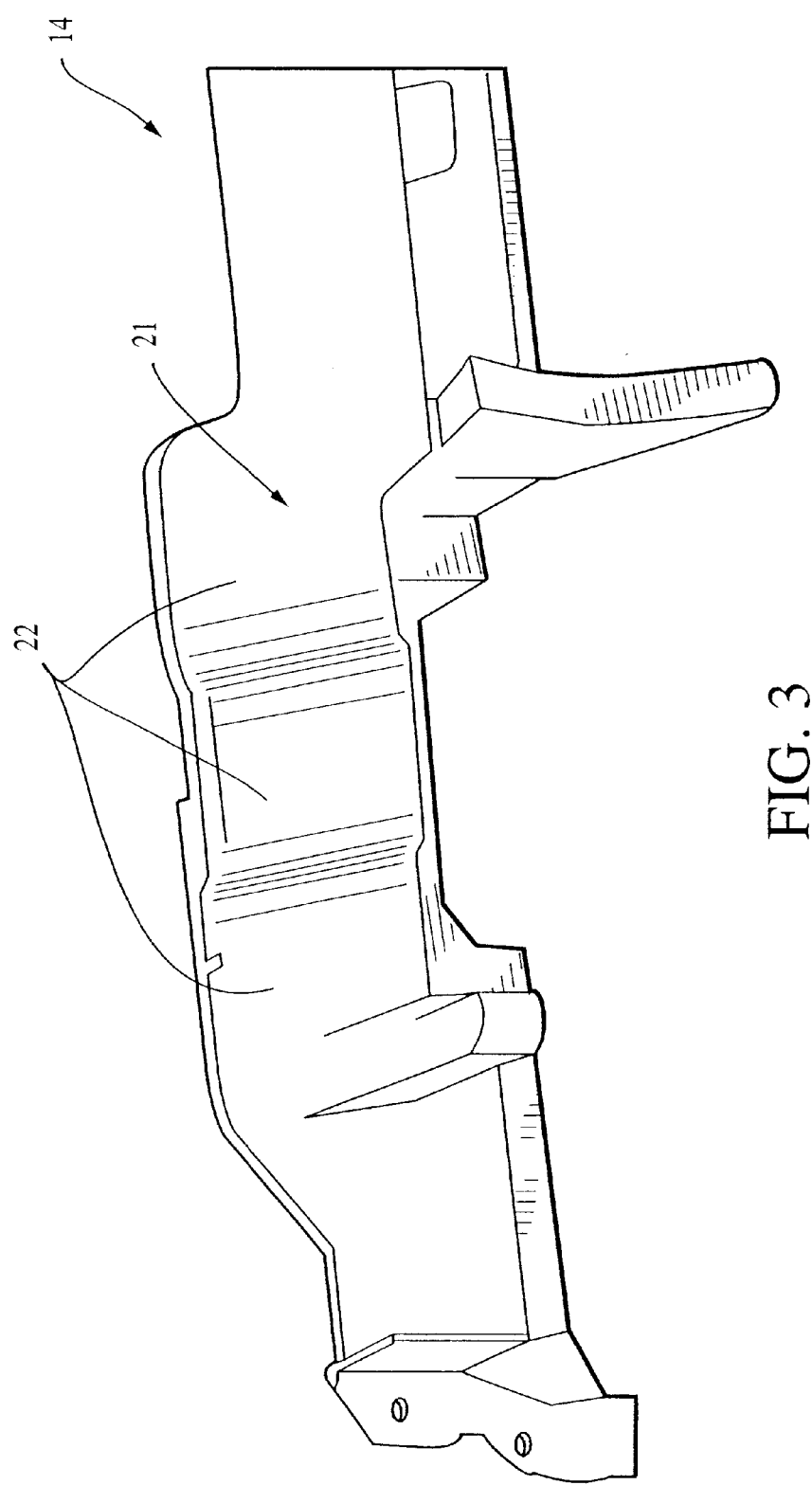
FIG. 3 is a perspective view of the embodiment of the cross-car beam structure of FIG. 1 in accordance with the present invention.
Figure 4:
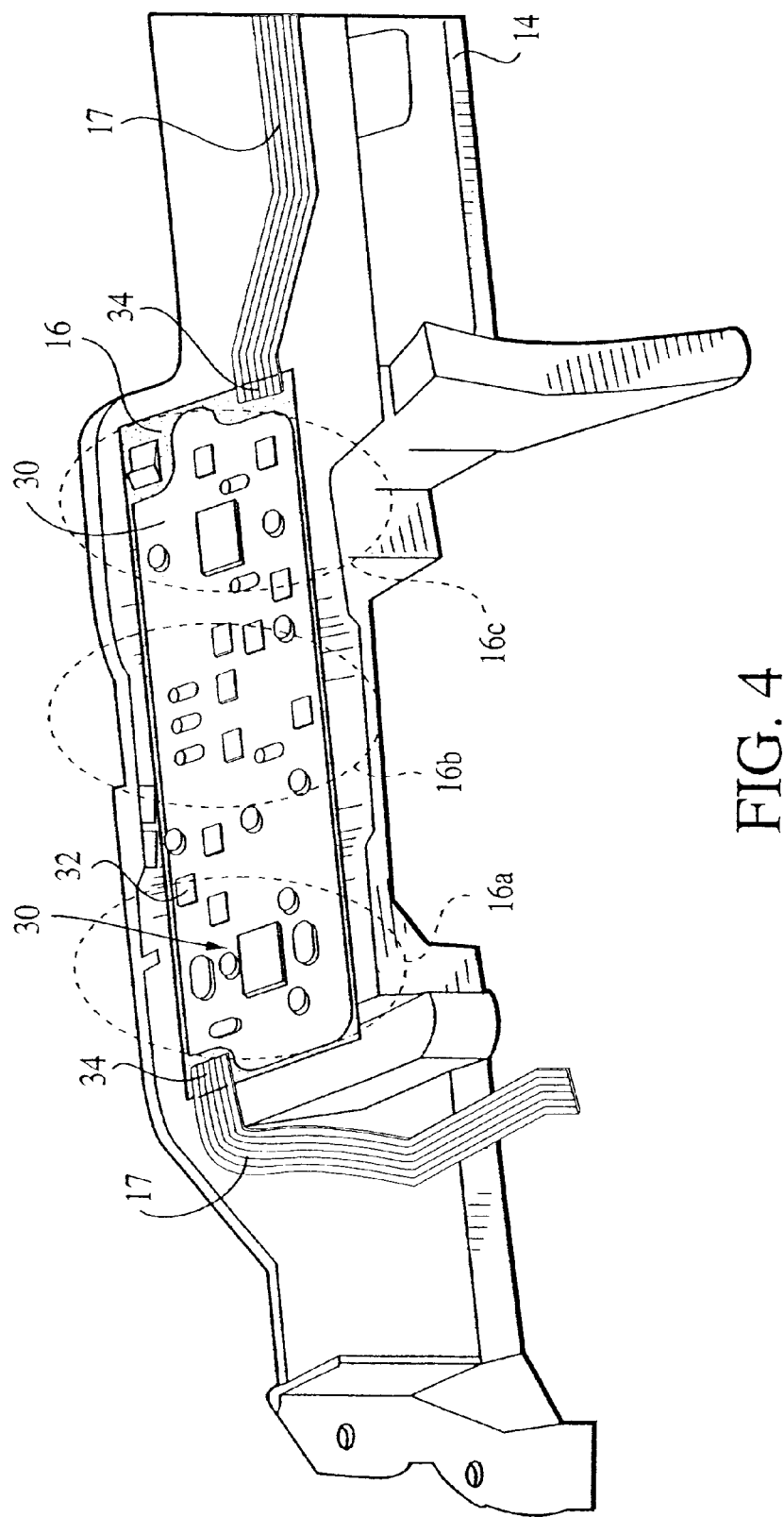
FIG. 4 is a perspective view of the structure shown in FIG. 3 including the installation of a double-sided substrate and flatwire in accordance with the present invention.

As shown in FIGS. 3 and 4, the generally planar areas 22 of the beam structure 14 may accommodate attachment and support of the flatwire bus 17 and populated or unpopulated portions of the substrate 16 as shown. The generally planar areas 22 also provide heat transfer points for heatsinking the flatwire circuitry in the bus structures 17 at attachment points with the structure and for heatsinking the populated electronic sites 30 of the substrate. Thus heat is conducted to the cross-car beam structure 14 to cool the electronics. Heat may be conducted to the metal cross-car beam 14 through a thermal pad, adhesive or grease that is applied to the surface of the cross-car beam 14 and acts as an interface between the electronic board and beam. The cross-car structure 14 preferably has contours and features as shown to route communication and power (bus) lines on the flatwire 17 across the instrument panel assembly 12. It is desirable to have the bus and high-thermal areas of the circuitry in direct contact with the metal cross-car structure 14 for cooling and to mechanically support the substrate. It is important to note that the generally planar surfaces 22 are not required to be completely flat. The surfaces may have some angle and/or curvature to them and will accommodate flexible substrate circuitry as well.

It is important to note that other recess structures may be implemented within the scope of this invention, as will be described in more detail below. The recess 20 in all of these configurations also acts as an electromagnetic (EMC/EMI) shield for the electronics within it.

The substrate 16 may be seen in more detail in FIG. 4. As shown, the substrate 16 includes a plurality of electronic components 32 installed on the substrate 16 in areas or population sites 30. The substrate may be a flexible or rigid circuit board material capable of mounting electronic componentry 32 and electrically connecting them to each other. FIG. 4 also shows the flatwire bus 17 connected to the substrate 16 at connection sites 34.

Referring back to FIG. 1, the particular substrate 16 that is shown is a double-sided populated substrate, having componentry that, in some areas, is mounted on both sides of the substrate 16. In particular, the substrate 16 in this embodiment preferably includes a first side 36 and a second side 38. Electronic componentry 32 may be mounted on the first side 36 in this embodiment, and additional electronic componentry may be mounted on the second side 38. In the present embodiment, the substrate 16 may be divided into three general portions 16A, 16B and 16C. Portions 16A and 16C are single-sided portions of the substrate 16 and include componentry 32 mounted only on the first side 36 of the substrate 16. Portion 16B, in this particular embodiment, includes the double-sided populated portion of the substrate 16 having electrical componentry 32 and 40 mounted on a first and second side 36 and 38, respectively of the substrate 16.

As noted above, each mounting site 21 on the beam 14 includes a recess or cavity 20 to allow for a double-sided populated substrate 16 and flatwire 17 to be attached to the beam 14. The recess or cavity 20 allows the double-sided populated portion 16B of the substrate 16 to be positioned over and partially within the recess 20. A support structure may also be installed in the cavity 20 to provide further support and minimize vibration effects on this area of flatwire. This support may include a plastic support piece mounted across the cavity 20 to prevent sag in the substrate. The cross-car beam 14 is also preferably electrically isolated from the substrate 16 unless a vehicle ground connect is needed. Attachment of the flatwire/substrate is achieved through the use of clips, press fit plastic retainers, adhesive, or other methods known in the art. In the alternative, the cross-car beam 14 may also act as a vehicle ground so that the flatwire electronics can be directly grounded, as needed.

Preferably, in order to provide additional hold-down support and protection to the electronic componentry 32 and 40 on the substrate 16, one or more component covers may be provided as shown. In particular, covers 19 may be provided to overlay portions of the substrate 16 having componentry 32 and a cover 23 may be provided on the lower-side components 40 of the substrate 16. The covers 19 and 23 preferably are formed from metal, plastic or film material and include bubble-like protective formations to overlay and protect the particular components. Preferably, the covers 19 and 23 may be snapped in place or held by conventional fasteners. The covers may also be held in place by the instrument panel skin 18 as described in more detail below. The covers are optional, but may be effectively used to add durability to the present embodiments. Of course, the shapes of the protective formations and the covers may be modified as necessary to fit the particular shapes of the components and the instrument panel parts.

Figure 5:
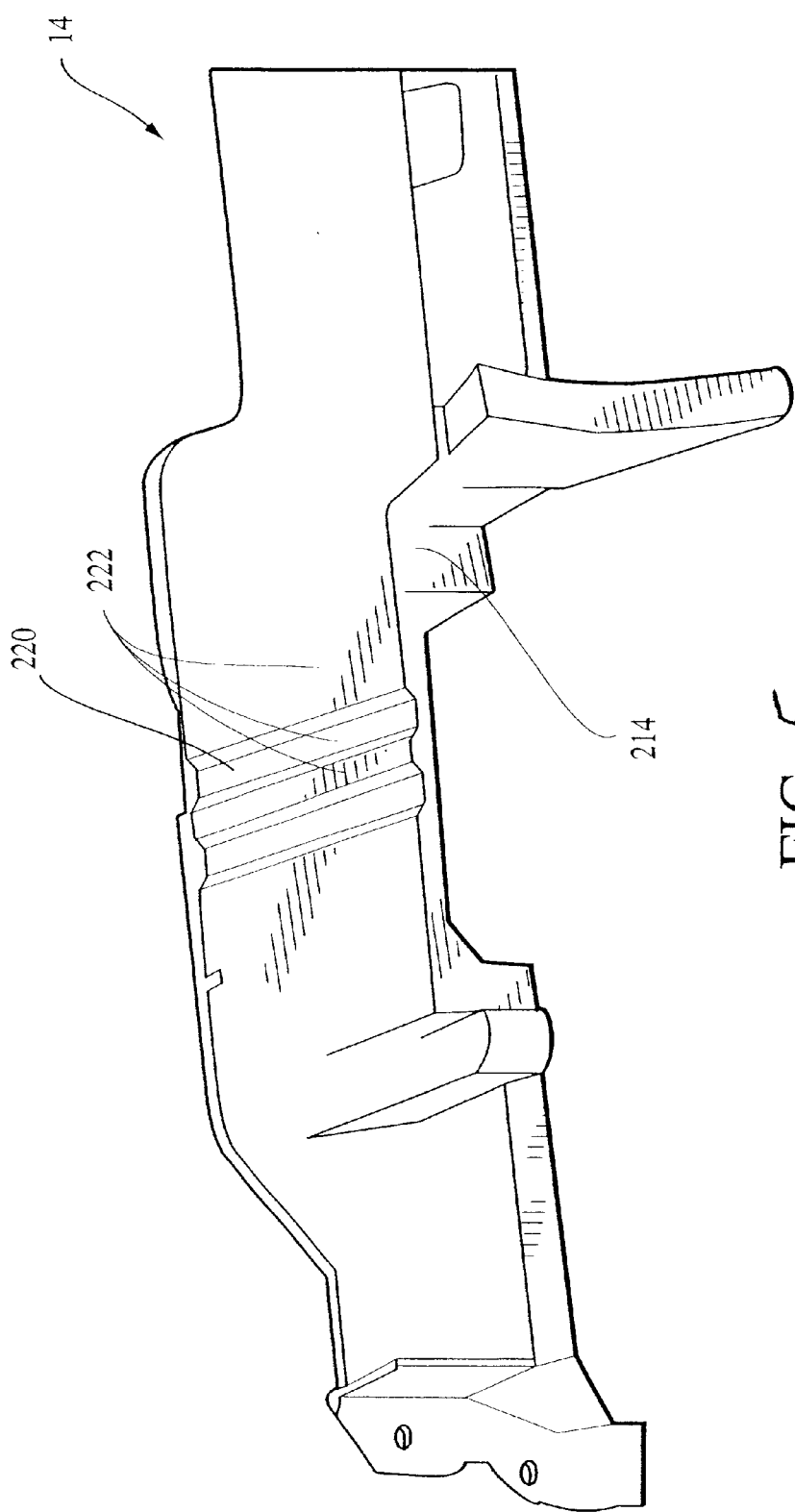
FIG. 5 is a perspective view of a second embodiment of a cross-car beam structure in accordance with the present invention.
Figure 6:
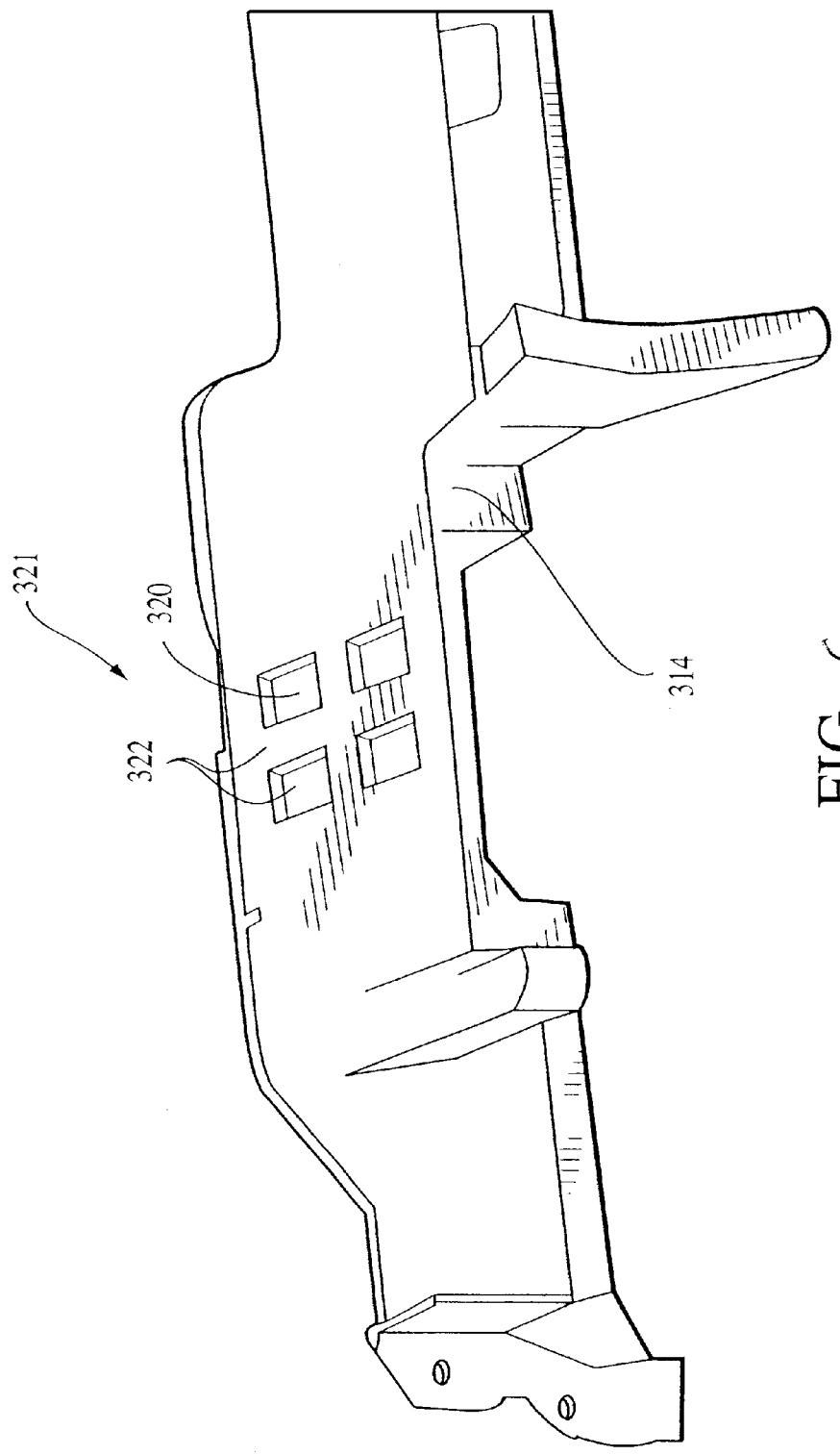
FIG. 6 is a perspective view of a third embodiment of a cross-car beam structure in accordance with the present invention.

It should be noted that the recess 20 in the cross-car beam structure 14 may be modified in a variety of shapes within the scope of the present invention. For example, as shown in FIG. 5, a second embodiment of the structure 214 may be provided wherein the recesses 220 are formed as elongated channel-like structures to accommodate other arrangements of double-sided componentry on a substrate. The generally planar surfaces 222 in this embodiment are also shown. A third embodiment is illustrated in FIG. 6, wherein a plurality of mounting sites 321 are provided with individual recesses or pockets 322 (and generally planar surfaces 322) in a beam 314 to accommodate yet another arrangement of componentry on an underside of a substrate.

To complete the main components of the instrument panel assembly 12, an instrument panel "skin" 18 may be provided which comprises the portion of the instrument panel that is displayed to the user. Preferably, the instrument panel skin 18 covers and encloses the optional cover 19, the substrate 16, the flatwire 17, and cross-car beam structure 14 to provide a uniform user interface to the driver and passenger of the vehicle.

It is also important to note that the cross-car structure 14 is designed to facilitate service and upgrade access to the flatwire 17, the substrate 16 and the various componentry 32 and 40 as new or optional features are added to the vehicle. Thus, the various componentry may be accessed by simply removing the skin 18 and covers 19 and 23 from the instrument panel assembly 12. Preferably, the attachment features for the instrument panel skin 18 and any supports therefor are extended from the beam 14 and the populated component sites 30 of either the flatwire 17 or substrate 16 are sandwiched between the skin 18 and the beam 14.

The invention may also be embodied in a method for supporting an instrument panel assembly 12. The method includes the steps of 1) providing a cross-car beam 14, the beam 14 preferably including a plurality of generally planar mounting areas 22 and recessed areas 20 as described above, the recessed and planar areas 20, 22 for mounting an electronic functional substrate 16 having portions that are double-sided with electrical componentry such as portion 16B; 2) connecting the substrate 16 with flatwire 17; 3) connecting the flatwire 17 and substrate having the double-sided populated portion 16B with the beam 14 so that portion 16B is aligned over recess 20; and 4) removably attaching the optional cover 19 and/or 23 over the substrate 16 and the beam 14. The instrument panel skin 18 may then be applied over the remainder of the assembly.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. An automobile instrument panel assembly for the cockpit area of an automobile, said assembly comprising:
    a cross-car beam structure for supporting said assembly, said structure extending across a substantial portion of said cockpit, said structure defining a plurality of generally planar mounting sites, said sites further defining at least one recess;
    at least one substrate mounted to said beam and including at least one area of said substrate populated by electronic components on both sides of said substrate, said area aligned over said at least one recess; and
    an instrument panel skin removably positioned over said substrate and said structure.

2. The assembly of claim 1 wherein said beam structure further comprises magnesium.

3. The assembly of claim 1 wherein said at least one recess further comprises at least one elongated channel defined on said beam structure.

4. The assembly of claim 1 wherein the cross-car beam structure further comprises molded plastic.

5. The assembly of claim 1 further comprising a plurality of electronic components mounted on a first side of said substrate, and at least one area on a second side of said substrate being populated by additional electronic components.

6. The assembly of claim 1 further comprising a plurality of structural ribs extending laterally across said structure to provide lateral support thereto.

7. The assembly of claim 5 further comprising at least one cover adapted to protect at least a portion of said components.

8. The assembly of claim 7 wherein said at least one cover are attached to said beam structure.

9. The assembly of claim 1 further comprising heat transfer medium disposed between at least a portion of said substrate and said beam.

10. The assembly of claim 1 wherein said recess is configured so that said components on said second side of said substrate are accessible for maintenance.

11. The assembly of claim 1 further comprising means for attaching said elongated beam to a frame structure of an automobile.

12. The assembly of claim 11 wherein said at least one of said planar surfaces includes a populated electronic site integrating a plurality of electronic components.

13. The assembly of claim 1 further comprising means on said elongated beam for attaching said instrument panel cover.

14. A cross-car structure for supporting an instrument panel, said structure comprising:
    at least one integrated and elongated beam;
    said beam defining a plurality of generally planar mounting areas for attachment to flatwire and populated flatwire sites;
    said beam further defining a plurality of recesses adapted to receive double-sided populated substrates in communication with said flatwire.

15. The structure of claim 14 wherein said beam structure further comprises magnesium.

16. The structure of claim 14 wherein the cross-car beam structure further comprises molded plastic.

17. The structure of claim 14 further comprising a plurality of electronic components assembled to a first side of said substrate, and at least a portion of a second side of said substrated being populated by additional electronic components.

18. The structure of claim 17 further comprising flatwire assemblies connected to fit said at least one substrate.

19. A method for supporting an instrument panel and associated electronic componentry, said method including the steps of:
    providing a cross-car beam having at least one integrated and elongated beam;
    said beam defining a plurality of generally planar mounting areas for attachment to flatwire and populated flatwire sites;
    said beam further defining a plurality of recesses adapted to receive double-sided populated substrates in communication with said flatwire;
    connecting a populated substrate and flatwire with said beam;
    connecting a substrate having at least one double-sided populated area with said beam and aligning said area over said at least one recess; and
    removably attaching a cover to the instrument panel assembly over at least a portion of said substrate and beam.

* * * * *

UNITED STATES PATENT AND TRADEMARK OFFICE
CERTIFICATE OF CORRECTION

PATENT NO. : 6,669,273 B1
DATED : December 30, 2003
INVENTOR(S) : Andrew Z. Glovatsky et al.

It is certified that error appears in the above-identified patent and that said Letters Patent is hereby corrected as shown below:

<u>Column 6,</u>
Line 38, delete "substrated" and substitute -- substrate -- in its place.

Signed and Sealed this

Twenty-fifth Day of May, 2004

JON W. DUDAS
*Acting Director of the United States Patent and Trademark Office*